United States Patent
Tao et al.

(10) Patent No.: US 10,177,645 B2
(45) Date of Patent: Jan. 8, 2019

(54) SYNCHRONOUS RECTIFIER TURN-ON ENABLE

(71) Applicant: SEMICONDUCTOR COMPONENTS INDUSTRIES, LLC, Phoenix, AZ (US)

(72) Inventors: Zhibo Tao, Palo Alto, CA (US); Taesung Kim, Seoul (KR); BongGeun Chung, Siheung-si (KR); Gwanbon Koo, Sunnyvale, CA (US); Lei Chen, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/789,119

(22) Filed: Oct. 20, 2017

(65) Prior Publication Data

US 2018/0358885 A1      Dec. 13, 2018

Related U.S. Application Data

(60) Provisional application No. 62/518,463, filed on Jun. 12, 2017.

(51) Int. Cl.
*H02M 1/08* (2006.01)
*H02M 7/217* (2006.01)

(52) U.S. Cl.
CPC .............. *H02M 1/08* (2013.01); *H02M 7/217* (2013.01)

(58) Field of Classification Search
CPC ........................ H02M 3/33576; H02M 3/33592

USPC ........ 363/21.13, 21.14, 21.17, 21.18, 78, 79, 363/89

See application file for complete search history.

(56) References Cited

U.S. PATENT DOCUMENTS

| | | | |
|---|---|---|---|
| 9,001,532 B2* | 4/2015 | Olivik | H02M 3/33592 363/21.14 |
| 9,013,898 B2* | 4/2015 | Ptacek | H02M 1/08 363/21.14 |
| 2008/0002441 A1* | 1/2008 | Allinder | H02M 3/33592 363/21.14 |
| 2009/0231895 A1* | 9/2009 | Hu | H02M 3/33592 363/127 |
| 2010/0027298 A1* | 2/2010 | Cohen | H02M 3/33592 363/21.14 |
| 2011/0150521 A1* | 6/2011 | Uchiyama | G03G 15/80 399/88 |

(Continued)

*Primary Examiner* — Gary Nash
(74) *Attorney, Agent, or Firm* — AMPACC Law Group, PLLC

(57) ABSTRACT

A circuit includes a drain detect circuit. The drain detect circuit receives a sense signal from a secondary side of a power converter circuit, determines, using voltage values of the sense signal, whether a primary side switch of the power converter circuit has been turned on, and assert a switch on detect signal in response to determining that the primary side switch has been turned on. The circuit may assert an enable signal in response to the assertion of the switch on detect signal, and de-asserts the enable signal in response to an assertion of a control signal. The control signal may only allowed to be asserted when the enable signal is asserted. The control signal may control a Synchronous Rectifier device. The power converter circuit may be a flyback converter, and the primary side switch may control a current into a primary-side coil of a transformer.

19 Claims, 5 Drawing Sheets

(56) References Cited

U.S. PATENT DOCUMENTS

| | | | |
|---|---|---|---|
| 2012/0300520 A1* | 11/2012 | Ren | H02M 3/33592 363/127 |
| 2015/0103567 A1* | 4/2015 | Wang | H02M 3/33592 363/21.13 |
| 2015/0280573 A1* | 10/2015 | Gong | H02M 3/33523 363/21.14 |
| 2015/0318790 A1* | 11/2015 | Tichy | H02M 3/33592 363/21.14 |

* cited by examiner

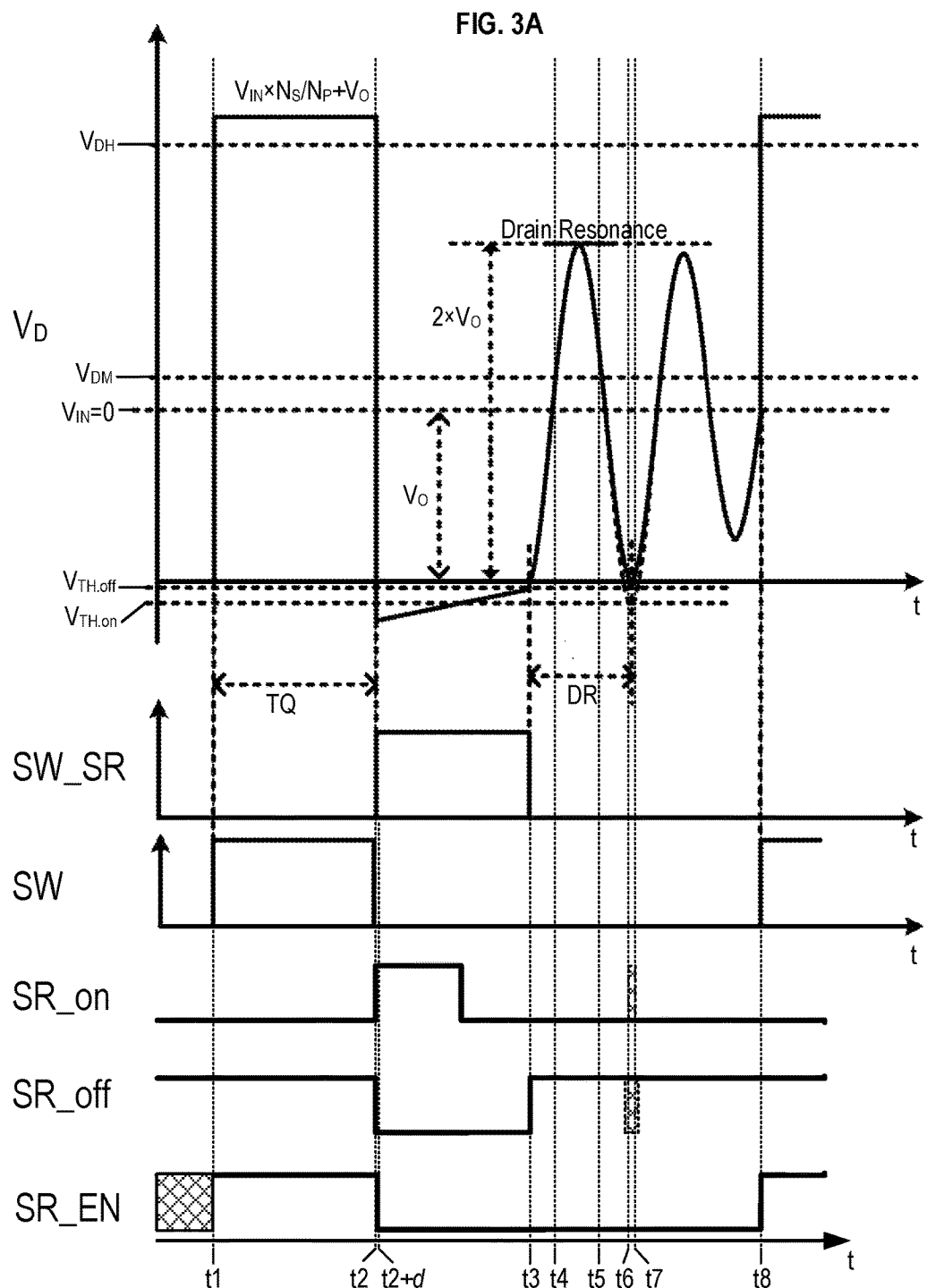

SYNCHRONOUS RECTIFIER TURN-ON ENABLE

CROSS-REFERENCES TO RELATED APPLICATIONS

The present invention claims the benefit of U.S. Provisional Application No. 62/518,463, filed Jun. 12, 2017, which is incorporated by reference herein for all purposes.

FIELD OF THE DISCLOSURE

The present disclosure relates generally to rectifying circuits, and more particularly to synchronous rectifier control circuits used in power converters.

BACKGROUND

The present disclosure relates, in general, to electronics, and more particularly, to circuits and method for providing power to electronic devices. Such circuits may use Synchronous Rectification (SR) circuits, in which an Alternating Current (AC) voltage is rectified using one or more switching devices, such as transistors, that are switched on and off synchronously with the AC voltage. The switching devices may be controlled by signals from an SR control circuit.

The SR control circuit may turn a switching device on and off in response to a voltage across the switching device or a current passing through the switching device. A first threshold, i.e., an on threshold, may be used when determining whether to turn the switching device on. A second threshold, i.e., an off threshold, may be used when determining whether to turn the switching device off.

Ringing on the voltage across the switching device way cause the voltage across the switching device to cross the on threshold at times when it would be inappropriate to turn on the switching device. The ringing may be present in a predictable period after the switching device is turned off. Accordingly, the SR control circuit may impose a minimum switching device turn-off time to prevent the ringing during the predicted period after the switching device is turned off from turning the switching device back on. However, the use of the minimum switching device turn-off time may interfere with the ability of the SR control circuit to operate at high frequencies or may require additional pins, components, or both to configure the minimum switching device turn-off time.

Accordingly, it is desirable to have SR control circuit that is able to prevent the ringing from turning on the switching device without the use of a minimum switching device turn-off time.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 3A includes waveforms illustrating operation of an SRC according to an embodiment under first operating conditions.

Figure 1:
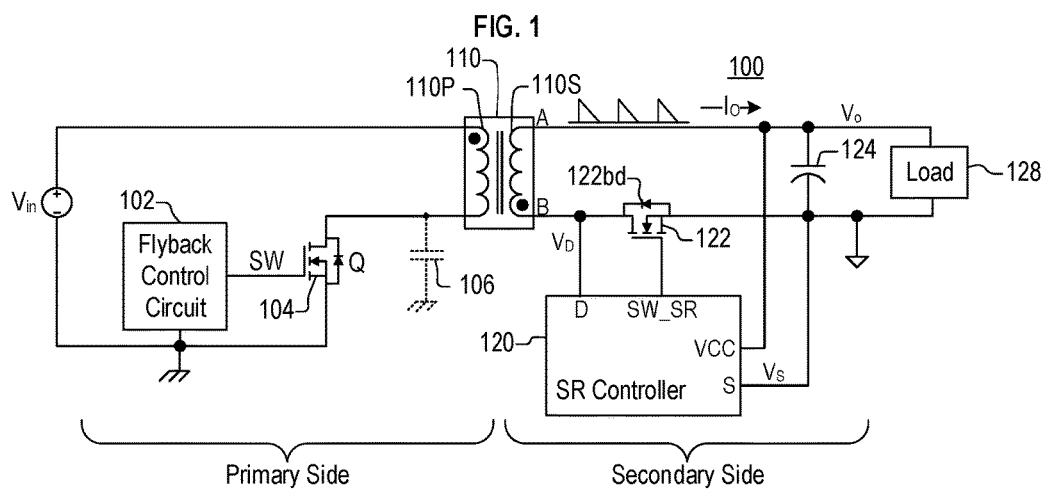
FIG. 1 illustrates a flyback converter according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to rectification circuits, and in particular to methods and circuits for Synchronous Rectifier (SR) control.

Embodiments prevent a Synchronous Rectifier Controller circuit (SRC) from turning on a Synchronous Rectifier (SR) switch device in response to ringing on a voltage being used to determine whether to turn the SR switch device on.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Similar reference numerals designate similar elements in the specification.

In an embodiment, a circuit comprises a drain detect circuit coupled to a conduction terminal of a Synchronous Rectifier (SR) device of a secondary side of a power converter. The drain detect circuit determines, using a voltage value of the conduction terminal, whether a switch of a primary side of the power converter has been turned on, and controls whether the SR device is turned on according to whether the switch of the primary side has been turned on.

In an embodiment, the circuit prevents the SR device being turned on again during a period beginning after the SR device is turned on and ending with the detection of the switch of the primary side being turned on. In another embodiment, the circuit prevents the SR device being turned on during a period beginning after the SR device is turned off and ending with the detection of the switch of the primary side being turned on.

In another embodiment, the circuit prevents the SR device being turned on more than once for each detection of the switch of the primary side being turned on.

In an embodiment, the circuit detects the switch of a primary side being turned on by detecting that the voltage value of the conduction terminal of the SR device is higher than a threshold value.

In an embodiment, the circuit detects the switch of a primary side being turned on by detecting that the voltage value of the conduction terminal of the SR device is higher than a threshold value for a period of time longer than a predetermined duration. In an embodiment, the period of time is an uninterrupted (that is, a continuous) period of time.

In an embodiment, the circuit detects the switch of a primary side being turned on by detecting that the voltage value of the conduction terminal of the SR device is higher than a first threshold value for a period of time longer than a predetermined duration or is higher than a second threshold value. In an embodiment, the second threshold value is greater than the first threshold value. In an embodiment, the period of time is a continuous period of time.

Embodiments prevent inappropriate triggering of an SR device, such as might occur due to ringing, while not unduly limiting a maximum frequency at which the SR device can operate. Embodiments may eliminate the need to determine an appropriate dead time (which may also be referred to as a blanking interval) for the SR device, and may eliminate the need for components, package connections, or both that might be required to implement said dead time.

FIG. 1 is a block diagram illustrating a flyback converter 100 according to an embodiment. A primary side of the flyback converter 100 includes a flyback control circuit 102, a Metal Oxide Semiconductor Field Effect Transistors (MOSFET) 104 (transistor Q in the figure), and a primary coil 110P of a transformer 110. The primary side also includes a lumped capacitance Cpar represented by a parasitic capacitor 106. A secondary side of the power controller 100 includes a secondary coil 110S of the transformer 110, a Synchronous Rectifier (SR) controller 120, an SR switching device 122, and an output capacitor 124. In an embodiment, the SR switching device 122 is a MOSFET, such as an n-channel power MOSFET as shown in FIG. 1, and includes a body diode 122*bd*.

The flyback converter 100 receives an input voltage $V_{in}$, and provides an output voltage $V_O$ to a load 128. The load 128 may include one or more integrated circuits (ICs). In an embodiment, the output voltage $V_O$ is used as a supply voltage to one or more of a Universal Serial Bus (USB) circuit, a Central Processing Unit (CPU), a Graphics Processing Unit (GPU), a memory integrated circuit, and the like. In an embodiment, the output voltage $V_O$ may be varied.

The flyback control circuit 102 generates a drive signal SW that is a square wave or a rectangular wave. A frequency of the drive signal SW may vary according to, for example, the output voltage $V_O$ (e.g., between 100 KHz and 200 Khz).

During a first (e.g., ON) portion of a cycle of the drive signal SW, the flyback control circuit 102 turns on the MOSFET 104. This causes energy to be supplied from the input voltage $V_{in}$ to the primary coil 110P, where it is stored as a magnetic flux in the transformer 110.

During a second (e.g., OFF) portion of a cycle of the drive signal SW, the flyback control circuit 102 turns off the MOSFET 104. In response, the energy stored in the transformer 110 is released through the secondary coil 110S, causing a current to flow in the secondary coil 110S and a voltage to develop across the A and B terminals of the secondary coil 110S.

The SRC 120 controls the SR switching device 122 to rectify the output of the secondary coil 110S, charging the output capacitor 124 and thereby providing the output voltage $V_O$. The SRC 120 controls the SR switching device 122 in response to a drain voltage $V_D$ sensed at a first conduction terminal (e.g., a drain terminal) of the SR switching device 122 using a sense signal received at a drain input D of the SRC 120. In the embodiment shown in FIG. 1, the drain voltage $V_D$ is sensed relative to a source voltage of a second conduction terminal (e.g. a source terminal) of the SR switching device 122, which source voltage is received at a source terminal S of the SRC 120. In another embodiment, the drain voltage $V_D$ may be sensed relative to a ground potential. The SRC 120 controls the SR switching device 122 using a SR control signal SW_SR coupled to a control terminal (e.g., a gate) of the SR switching device 122.

When the voltage across the secondary coil 110S has a first polarity, for example, when the A terminal of the secondary coil 110S is negative relative to the B terminal of the secondary coil 110S, a body diode 122*bd* of the SR switching device 122 is reverse biased and no current flows through the body diode 122*bd*. The sensed drain voltage $V_D$ is greater than an off threshold voltage $V_{TH.off}$, and in response the SRC 120 outputs the SR control signal SW_SR having a value that turns off the SR switching device 122. As a result, no current flows from the secondary coil 110S to the output capacitor 124.

When the voltage across the secondary coil 110S changes to a second polarity, for example, when the A terminal is positive relative to the B terminal, and a magnitude of a voltage difference between A and B is greater than the sum of the present value of the output voltage Vo and a forward voltage drop of the body diode 122*bd* (e.g., 0.7V), the body diode 122*bd* of the SR switching device 122 begins to conduct. The sensed drain voltage $V_D$ becomes less than an on threshold voltage $V_{TH.on}$, and in response the SRC 120 outputs the SR control signal SW_SR having a value that turns on the SR switching device 122. As a result, current flows from the secondary coil 110S to the output capacitor 124.

When the voltage across the secondary coil 110S starts to change back to the first polarity, the magnitude of the sensed drain voltage $V_D$ decreases, which because the sensed drain voltage $V_D$ is negative corresponds to an increase in the sensed drain voltage $V_D$. The sensed drain voltage $V_D$ then rises above an off threshold voltage $V_{TH.off}$.

In response to the sensed drain voltage $V_D$ rising above the off threshold voltage $V_{TH.off}$, the SRC 120 outputs the SR control signal SW_SR having the value that turns off the SR switching device 122. The SRC 120 may turn the SR switching device 122 off before the voltage across the secondary coil 110S changes to the first polarity.

The flyback converter 100 may include additional elements, such as feedback circuits, sleep circuits, startup circuits, protection circuits, and the like, which are known in the art and have been omitted in the interest of brevity.

Figure 2:
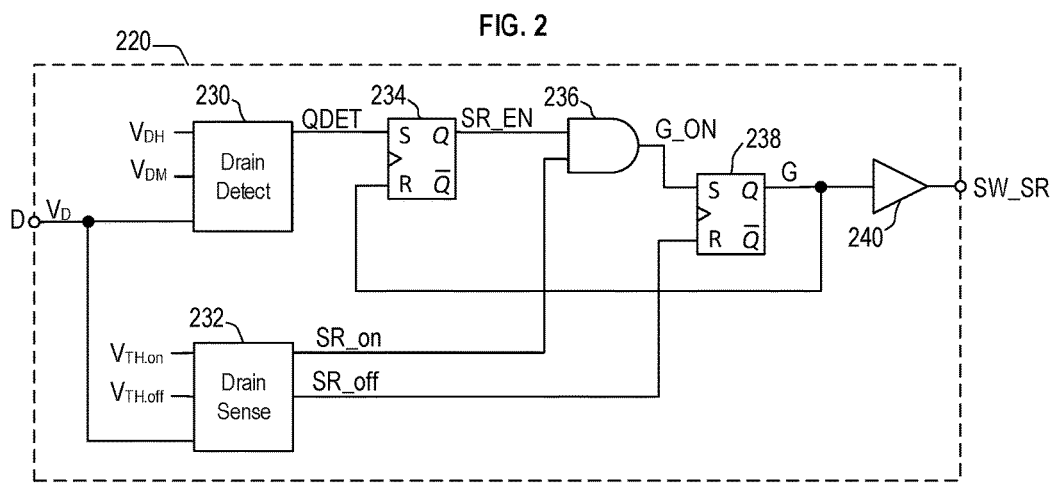
FIG. 2 illustrates a Synchronous Rectifier (SR) controller circuit (SRC) according to an embodiment.

FIG. 2 illustrates an SR Controller circuit 220 (hereinafter, SRC 220) according to an embodiment. The SRC 220 is suitable for use as the SRC 120 of the flyback converter 100 of FIG. 1.

The SRC 220 receives an drain voltage $V_D$ at a drain input D and generates an SR control signal SW_SR suitable for controlling an SR switching device, such as the SR switching device 122 shown in FIG. 1. In the embodiment of FIG.

2, the SRC circuit 220 senses the drain voltage $V_D$ relative to a secondary side ground (not shown), but embodiments are not limited thereto.

The SRC 220 includes a drain detect circuit 230, a drain sense circuit 232, first and second set-reset flip-flops (SRFFs) 234 and 238, an AND gate 236, and a Synchronous Rectifier (SR) driver 240. The SRC 220 may include additional elements which are known in the art and have been omitted in the interest of brevity.

The drain detect circuit 230 receives the drain voltage $V_D$, a high detect value $V_{DH}$, and a middle detect value $V_{DM}$. The drain detect circuit 230 produces a primary transistor (Q) on detect signal QDET according to the drain voltage $V_D$, the high detect value $V_{DH}$, and the middle detect value $V_{DM}$.

In an embodiment, the drain detect circuit 230 asserts the Q on detect signal QDET in response to the drain voltage $V_D$ having a value higher than the high detect value $V_{DH}$.

in another embodiment, the drain detect circuit 230 asserts the Q on detect signal QDET in response to the drain voltage $V_D$ having a value consistently higher than the middle detect value $V_{DM}$ for a predetermined uninterrupted duration.

In another embodiment, the drain detect circuit 230 asserts the Q on detect signal QDET in response to either the drain voltage $V_D$ having a value higher than the high detect value $V_{DH}$ or the drain voltage $V_D$ having a value higher than the middle detect value $V_{DM}$ for the predetermined uninterrupted duration.

The drain sense circuit 232 receives the drain voltage $V_D$, an on threshold value $V_{TH.on}$, and an off value threshold $V_{TH.off}$. The drain sense circuit 232 produces an SR on signal SR_on and an SR off signal SR_off according to the drain voltage $V_D$, the on threshold value $V_{TH.on}$, and the off threshold value $V_{TH.off}$. In an embodiment, the on threshold value $V_{TH.on}$ is less than the off threshold value $V_{TH.off}$.

In an embodiment, the drain sense circuit 232 asserts the SR on signal SR_on in response to the drain voltage $V_D$ having a value lower than the on threshold value $V_{TH.on}$.

In an embodiment, the drain sense circuit 232 asserts the SR_off signal SR_off in response to the drain voltage $V_D$ having a value higher than the off threshold value $V_{TH.off}$.

The first SRFF 234 produces an SR on enable signal SR_EN according to the Q on detect signal QDET and a gate signal G. The first SRFF 234 asserts the SR on enable signal SR_EN in response to the Q on detect signal QDET being asserted and de-asserts the SR on enable signal SR_EN in response to the gate signal G being asserted.

In another embodiment, the SR on enable signal SR_EN may be produced by a circuit that asserts the SR on enable signal SR_EN in response to the Q on detect signal QDET being asserted and de-asserts the SR on enable signal SR_EN in response to a falling edge (i.e. the de-assertion) of the gate signal G.

The AND gate 236 generates a gate on signal G_ON according to the SR on enable signal SR_EN and the SR on signal SR_on. The AND gate 236 asserts the gate on signal G_ON when both the SR on enable signal SR_EN and the SR on signal SR_on are asserted.

The second SRFF 238 produces the gate signal G according to the gate on signal G_ON and the SR_off signal SR_off. The second SRFF 238 asserts the gate signal G in response to the gate on signal G_ON being asserted and de-asserts the gate signal G in response to the SR_off signal SR_off being asserted.

The SR driver 240 generates the SR control signal SW_SR according to the gate signal G. In embodiment, the SR driver 240 performs one or more of buffering, inverting, and level shifting of the gate signal G to produce the SR control signal SW_SR. In another embodiment, the SR driver 240 is replaced by a conductor or a resistor.

FIG. 3A includes waveforms illustrating operation of the SRC 220 of FIG. 2 in the flyback converter 100 of FIG. 1 according to an embodiment given first operating conditions. In particular, FIG. 3A illustrates operations when a drain voltage $V_D$ has value greater than a high detect value $V_{DH}$ when a drive signal SW is turned on, as described below. FIG. 3A includes waveforms of the drain voltage $V_D$, the SR control signal SW_SR and the (primary side) drive signal SW shown in FIG. 1. FIG. 3A further includes waveforms of the SR on signal SR_on, the SR_off signal SR_off, and the SR on enable signal SR_EN of FIG. 2.

At the first time $t_1$, the drive signal SW turns on, causing the MOSFET 104 on the primary side to turn on (conduct) and current to flow from the input voltage $V_{IN}$ into the primary coil 110P. As a result, the drain voltage $V_D$ become equal to $$V_D = V_{IN} \times N_S/N_P V_O \qquad \text{Equation 1}$$

wherein $V_{IN}$ is a value of the input voltage $V_{IN}$, $N_P$ is a number of turns of the primary coil 110P, $N_S$ is a number of turns of the primary coil 110S, and $V_O$ is the value of the output voltage $V_O$.

Because the drain voltage $V_D$ is greater than the high detect value $V_{DH}$, the SR on enable signal SR_EN is asserted. Because the drain voltage $V_D$ is greater than the on threshold value $V_{TH.on}$, the SR on signal SR_on is de-asserted. Because the drain voltage $V_D$ is greater than the off threshold value $V_{TH.off}$, the SR_off signal SR_off is asserted.

At a second time t2, the drive signal SW turns off, causing the MOSFET 104 to turn off. As a result, energy is transferred from the transformer 110 through the secondary coil 110S, and the polarity of the drain voltage $V_D$ changes. The drain voltage $V_D$ drop below the off threshold value $V_{TH.off}$ and the on threshold value $V_{TH.on}$, and in response the SR on signal SR_on is asserted and the SR_off signal SR_off is de-asserted.

In response to the SR on signal SR_on and the SR on enable signal SR_EN being asserted, the gate signal G is asserted, causing the SR control signal SW_SR to be asserted. The assertion of the SR control signal SW_SR turns on the SR switching device 122.

In response to the gate signal G being asserted, at the second time t2 plus a propagation delay time d (that is, at a time t2+d) the SR on enable signal SR_EN is de-asserted.

A duration TQ of the MOSFET 104 being on (that is, the interval between the first time t1 and the second time t2) may decrease with increases in the input voltage $V_{IN}$ and increase with decreases in the input voltage $V_{IN}$. The duration TQ may increase with increases in an output current $I_O$ of the secondary side and decrease with decreases in the output current $I_O$.

At a third time t3, the drain voltage $V_D$ rises above the off threshold value $V_{TH.off}$. In response, the SR_off signal SR_off is asserted, causing the gate signal G to be de-asserted and the SR control signal SW_SR to be de-asserted. The de-assertion of the SR control signal SW_SR turns off the SR switching device 122.

Because the SR switching device 122 is turned off, a drain resonance on the primary side may cause ringing on the drain voltage $V_D$. The ringing may have an amplitude of approximately twice the magnitude of the output voltage $V_O$. The ringing may have a period corresponding to a drain resonant period DR, equal to $$DR = 2\pi\sqrt{Lm \times Cpar} \qquad \text{Equation 2}$$

wherein Lm is an inductance of the primary coil 110P and Cpar is a lumped equivalent capacitance at a drain of the MOSFET 104, represented in FIG. 1 by the parasitic capacitor 106.

At a fourth time t4, the drain voltage $V_D$ rises above the middle detect value $V_{DM}$. In response, the drain detect circuit 230 begins determining the duration of the drain voltage $V_D$ being above the middle detect value $V_{DM}$.

At a fifth time t5, the drain voltage $V_D$ drops below the middle detect value $V_{DM}$. Because, in the example shown in FIG. 3A, the duration of the drain voltage $V_D$ being above the middle detect value $V_{DM}$ was less than a predetermined duration TP, the drain detect circuit 230 does not assert the SR on enable signal SR_EN.

However, if (as not shown in FIG. 3A) the interval between the fourth time t4 and the fifth time t5 had been longer than the predetermined duration TP, the drain detect circuit 230 would have asserted the SR on enable signal SR_EN, and the SR on enable signal SR_EN would have remained asserted until the gate signal G was asserted at some later time.

The predetermined duration TP may be determined according to the anticipated range of durations TQ of the MOSFET 104 being on and the drain resonant period DR. In an embodiment, the predetermined duration TP may be greater than the expected value of the drain resonant period DR and less than a shortest expected duration TQ of the MOSFET 104 being on.

At a sixth time t6, the ringing causes the drain voltage $V_D$ to drop near (as shown by the solid lines) or beneath (as shown by the dashed lines) the on threshold value $V_{TH.on}$.

If the drain voltage $V_D$ drops below on threshold value $V_{TH.on}$ in the interval between the sixth time t6 and the seventh time t7, the SR on signal SR_on may be asserted and the SR_off signal SR_off may be de-asserted. However, because the SR on enable signal SR_EN is de-asserted, the gate signal G is not asserted, the SR control signal SW_SR is not asserted, and the SR switching device 122 remains off.

At an eighth time t8, the drive signal SW turns on, causing the MOSFET 104 to turn on and current to flow from the input voltage $V_{IN}$ into the primary coil 110P. As a result, the drain voltage $V_D$ become greater than the high detect value $V_{DH}$, and the SR on enable signal SR_EN is asserted.

In an embodiment, the high detect value $V_{DH}$ is greater than a peak amplitude of the ringing on the drain voltage $V_D$, that is, greater than twice the output voltage $V_O$, to distinguish the ringing from the effects of turning on the MOSFET 104. In an embodiment, the middle detect value $V_{DM}$ is greater than the output voltage $V_O$ and less than twice the output voltage $V_O$ to ensure detection of the turning on the MOSFET 104 over the anticipated ranges of the input voltage $V_{IN}$.

In an embodiment, the high detect value $V_{DH}$ accommodates operation of the flyback converter 100 at a high end of a range of anticipated values for the input voltage $V_{IN}$, and the middle detect value $V_{DM}$ accommodates operation of the flyback converter 100 at all values, and especially low values, of the range of anticipated values for the input voltage $V_{IN}$. That is, the middle detect value $V_{DM}$ together with the predetermined duration TP is used to differentiate between a voltage caused by a resonant ring and a drain pulse caused by the primary side supplying power to the primary coil over an entire expected range of the input voltage $V_{IN}$, And when the input voltage $V_{IN}$ is high enough that $V_{IN} \times N_S/N_P + V_O$ becomes higher than the high detect value $V_{DH}$, the drain pulse caused by the primary side supplying power to the primary coil is detected immediately when it occurs, without regard to its duration, thereby accommodating a lower duration of the primary side supplying power to the primary coil that may occur when, for example, the input voltage $V_{IN}$ is high and the output current $I_O$ is low.

Figure 3B:
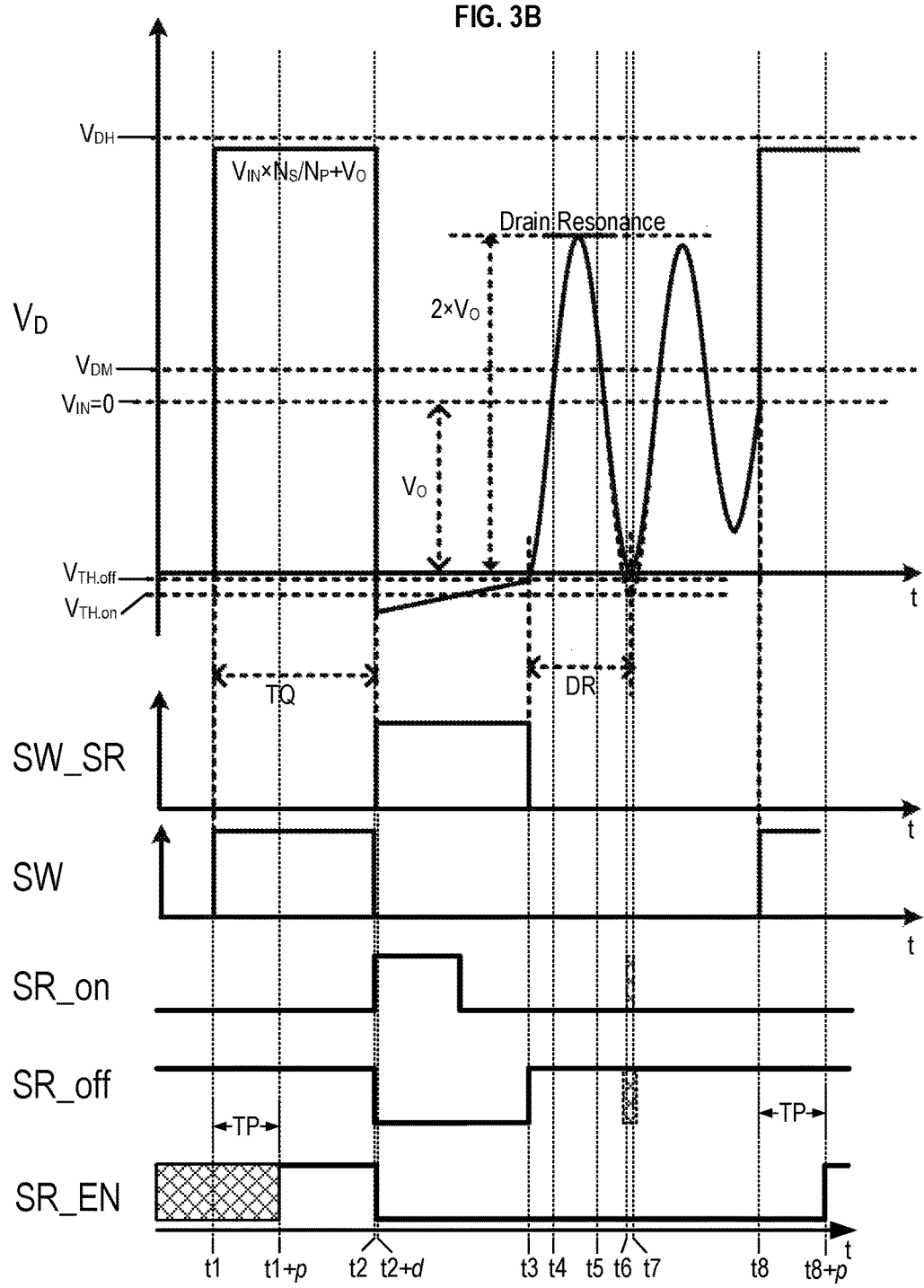
FIG. 3B includes waveforms illustrating operation of an SRC according to an embodiment under second operating conditions.

FIG. 3B includes waveforms illustrating operation of the SRC 220 of FIG. 2 in the flyback converter 100 of FIG. 1 according to an embodiment given second operating conditions. In particular, FIG. 3B illustrates operations when a drain voltage $V_D$ has value less than a high detect value $V_{DH}$ and greater than a middle detect value $V_{DM}$ when a drive signal SW is turned on, as described below.

At the first time $t_1$, the drive signal SW turns on, causing the MOSFET 104 on the primary side to turn on (conduct) and current to flow from the input voltage $V_{IN}$ into the primary coil 110P.

Because the drain voltage $V_D$ is greater than the on threshold value $V_{TH.on}$, the SR on signal SR_on is de-asserted. Because the drain voltage $V_D$ is greater than the off threshold value $V_{TH.off}$, the SR_off signal SR_off is asserted. Because the drain voltage $V_D$ is less than the high detect value $V_{DH}$, the SR on enable signal SR_EN is not asserted immediately after the first time $t_1$, as was the case in FIG. 3A.

Because the drain voltage $V_D$ is greater than the middle detect value $V_{DM}$, a measurement of the time the drain voltage $V_D$ is greater than the middle detect value $V_{DM}$ begins at the first time t1. The measurement may be performed by a pulse width comparator, as described in FIG. 4, below. The measurement may determine whether the drain voltage $V_D$ is greater than the middle detect value $V_{DM}$ for an uninterrupted period equal to or greater than a predetermined duration TP. The predetermined duration TP may be determined according to a reference voltage or a reference current.

At the first plus duration time T1+p, in response to the drain voltage $V_D$ being greater than the middle detect value $V_{DM}$ for the predetermined duration TP, the SR on enable signal SR_EN is asserted.

Subsequent to the first plus duration time T1+p, the SRC 220 of FIG. 2 operates as described with respect to FIG. 3A until the eighth time t8.

At the eighth time t8, the drive signal SW turns on, causing the MOSFET 104 on the primary side to turn on (conduct) and current to flow from the input voltage $V_{IN}$ into the primary coil 110P.

Because the drain voltage $V_D$ is less than the high detect value $V_{DH}$, the SR on enable signal SR_EN is not asserted immediately after the first time $t_1$, as was the case in FIG. 3A.

Because the drain voltage $V_D$ is greater than the middle detect value $V_{DM}$, a measurement of the time the drain voltage $V_D$ is greater than the middle detect value $V_{DM}$ begins at the eighth time t8.

At the eighth plus duration time T8+p, in response to the drain voltage $V_D$ being greater than the middle detect value $V_{DM}$ for the predetermined duration TP, the SR on enable signal SR_EN is asserted.

Figure 4:
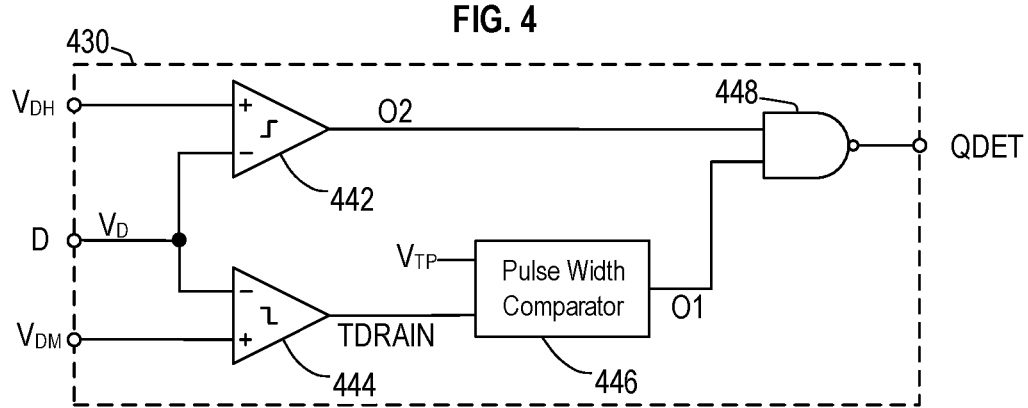
FIG. 4 illustrates a drain detect circuit suitable for use in an SRC according to an embodiment.

FIG. 4 illustrates a drain detect circuit 430 suitable for use in an SRC according to an embodiment. In an embodiment, the drain detect circuit 430 is included in the drain detect circuit 230 of FIG. 2.

The drain detect circuit 430 receives a drain voltage $V_D$ at a drain terminal D, a high detect value $V_{DH}$, and a middle detect value $V_{DM}$. The drain detect circuit 430 generates a Q on detect signal QDET according to the drain terminal D, the high detect value $V_{DH}$, and the middle detect value $V_{DM}$.

The Q on detect signal QDET being asserted may correspond to the detection of a primary side switch (such as the MOSFET 104, i.e., transistor Q) of FIG. 1) being turned on.

The drain detect circuit 430 includes a first comparator 442, a second comparator 444, a pulse width comparator circuit 446, and an NAND gate 448.

The first comparator 442 generates a second output O2 according to the drain voltage $V_D$ and the high detect value $V_{DH}$. The first comparator 442 de-asserts the second output O2 when the drain voltage $V_D$ has a value greater than the high detect value $V_{DH}$, and asserts the second output O2 when the drain voltage $V_D$ has a value less than the high detect value $V_{DH}$.

The second comparator 444 generates a drain pulse detect signal TDRAIN according to the drain voltage $V_D$ and the middle detect value $V_{DM}$. The second comparator 444 asserts the drain pulse detect signal TDRAIN when the drain voltage $V_D$ has a value less than the middle detect value $V_{DM}$, and de-asserts drain pulse detect signal TDRAIN when the drain voltage $V_D$ has a value greater than the middle detect value $V_{DM}$.

The pulse width comparator circuit 446 generates a first output O1 according to the pulse detect signal TDRAIN and a TP voltage value $V_{TP}$. The TP voltage value $V_{TP}$ is determined according to a predetermined duration TP. The pulse width comparator circuit 446 de-asserts the first output O1 when the drain pulse detect signal TDRAIN has been continuously de-asserted (that is, the value of the drain voltage $V_D$ has been continuously greater than the middle detect value $V_{DM}$) for longer than the predetermined duration TP, and asserts the first output O1 otherwise.

The NAND gate 448 generates the Q on detect signal QDET according to the first and second outputs O1 and O2. The NAND gate 448 asserts the Q on detect signal QDET when either or both of the first and second outputs O1 and O2 are de-asserted, that is, when either the drain voltage $V_D$ has been continuously greater than the middle detect value $V_{DM}$ for longer than the than the predetermined duration TP, the drain voltage $V_D$ is greater than the high detect value $V_{DH}$, or both. Otherwise, when both the first and second outputs O1 and O2 are asserted, the NAND gate 448 de-asserts the Q on detect signal QDET.

Figure 5:
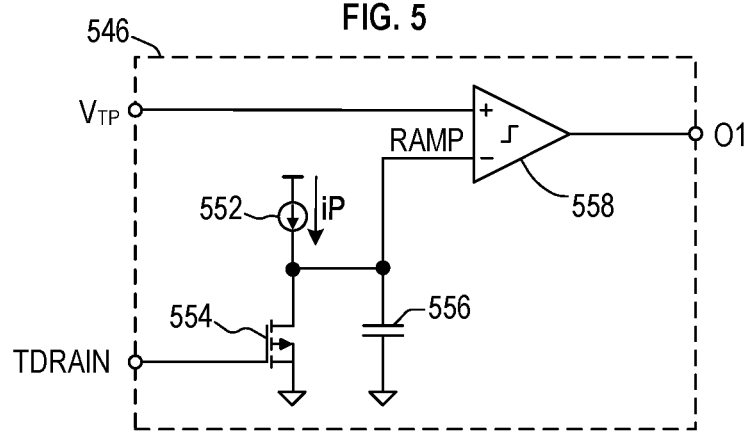
FIG. 5 illustrates a pulse width comparator circuit suitable for use in a drain detect circuit according to an embodiment.

FIG. 5 illustrates a pulse width comparator circuit 546 suitable for use in a drain detect circuit according to an embodiment. In an embodiment, the pulse width comparator circuit 546 is included in the pulse width comparator circuit 446 of FIG. 4.

The pulse width comparator circuit 546 includes a ramp generator circuit that generates a ramp signal RAMP. The ramp generator circuit comprises a transistor 554 (here, a MOSFET), a current source 552, and a capacitor 556. A current iP produced by the current source 552 and a capacitance $C_R$ of the capacitor 556 are selected so that:

$$V_{TP}=TP \times iP/C_R \qquad \text{Equation 3}$$

where Tp is the predetermined duration TP corresponding to the TP voltage value $V_{TP}$.

The ramp generator circuit resets the ramp signal RAMP to zero when the drain pulse detect signal TDRAIN is asserted, and allows the ramp signal RAMP to increase according to the current iP provided to the capacitor 556 when the drain pulse detect signal TDRAIN is de-asserted The comparator 558 de-asserts the first output signal O1 when the ramp signal RAM exceeds the TP voltage value $V_{Tp}$, indicating that the drain voltage VD has continually been above middle detect value $V_{DM}$ for longer than the predetermined duration TP. Otherwise, the comparator 558 asserts the first output signal O1.

Figure 6:
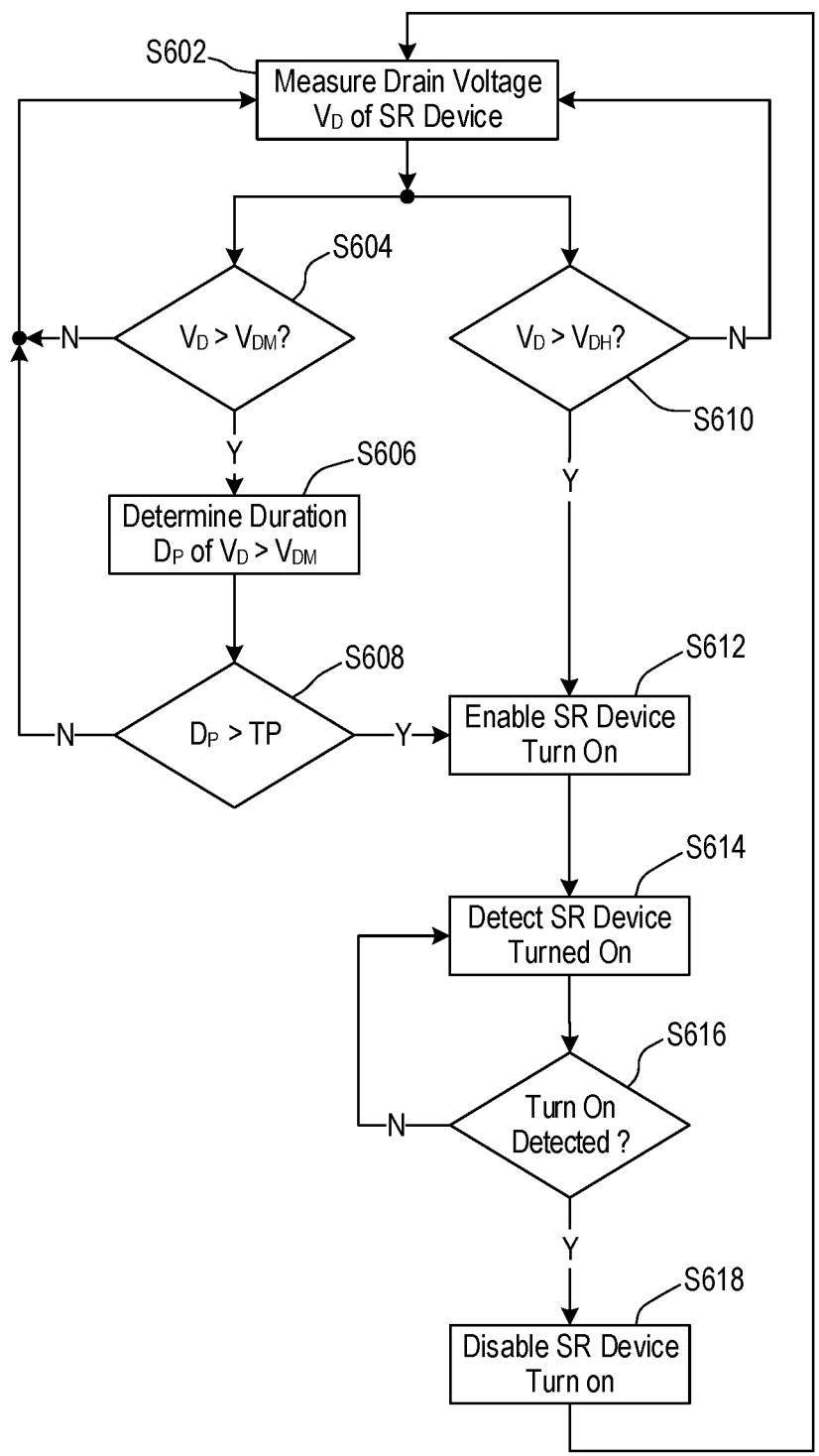
FIG. 6 illustrates a process for enabling an SRC to turn on a switching device according to an embodiment.

FIG. 6 illustrates a process 600 for enabling an SRC to turn on a switching device (the SR device) according to an embodiment, which may be used in an SRC such as the SRC 220 of FIG. 2.

At S602, the process 600 measures a drain voltage $V_D$ of the SR device. Form S602, the process 600 proceeds down two parallel paths, to S604 and S610.

At S604, the process 600 compares the drain voltage $V_D$ to a middle detect voltage $V_{DM}$. When the drain voltage $V_D$ is greater than the middle detect voltage $V_{DM}$, the process 600 proceeds to S606, otherwise the process 600 proceeds to S602.

At S606, process 600 determines a duration $D_p$ of the drain voltage $V_D$ being continuously greater than the middle detect voltage $V_{DM}$.

At S608, the process 600 compares the duration $D_p$ to a predetermined duration TP. When the duration $D_p$ is greater than the predetermined duration TP, the process 600 proceeds to S612, otherwise the process 600 proceeds to S602.

In an embodiment, the predetermined duration TP is determined according to a period of a ringing of the conduction terminal of the switching device and an expected minimum duration of the switching device being been turned on. For example, the predetermined duration TP may be greater than the period of a ringing of the conduction terminal of the switching device and less than the expected minimum duration of the switching device being been turned on.

At S610, the process 600 compares the drain voltage $V_D$ to a high detect voltage $V_{DH}$. When the drain voltage $V_D$ is greater than the high detect voltage $V_{DH}$, the process 600 proceeds to S612, otherwise the process 600 proceeds to S602.

At S612, the process 600 enables turning on of the SR device. S612 may corresponds to a detection that a primary side transistor of a DC-to-DC converter, such as the MOSFET 104 of the flyback converter 100 of FIG. 1, has been turned on.

Note that process 600 only enables the turning on of the SR device at S612. The actually turning on of the SR device is performed, in this embodiment, by a different process (not shown).

At S614, the process 600 detects whether the SR device has been turned on. In an embodiment, determine whether the SR device has been turned on is performed by monitoring a signal used to control the SR device, such as a gate control signal.

At S616, when the turn on of the SR device is detected, the process 600 proceeds to S618, otherwise the process 600 proceeds to S614.

At S618, the process 600 disables turning on of the SR device. Note that the turning off of the SR device is performed, in this embodiment, by a different process (not shown).

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A circuit comprising:
a drain detect circuit including a first comparator circuit, the drain detect circuit to:
receive a sense signal from a secondary side of a power converter circuit;
determine, using the first comparator circuit and a voltage value of the sense signal, whether a switch of the primary side of the power converter circuit has been turned on; and
assert a switch on detect signal in response to determining that the switch of the primary side has been turned on,
wherein the circuit asserts an enable signal in response to an assertion of the switch on detect signal,
wherein the circuit de-asserts the enable signal in response to an assertion of a control signal, and
wherein the enable signal controls whether the control signal is asserted.

2. The circuit of claim 1, wherein the first comparator circuit is to determine that the switch of the primary side has been turned on in response to the voltage value of the sense signal being greater than a first predetermined detect value.

3. The circuit of claim 2, wherein a magnitude of the first predetermined detect value is greater than a magnitude of an output voltage of the power converter circuit.

4. The circuit of claim 2, wherein the drain detect circuit further comprises:
a pulse detect circuit to determine that the switch of the primary side has been turned on when the voltage value of the sense signal is greater than a second predetermined detect value for longer than a predetermined duration.

5. The circuit of claim 4, wherein the pulse detect circuit comprises:
a second comparator circuit to generate a detect signal according to whether the voltage value of the sense signal is greater than the second predetermined detect value; and
a pulse width comparator circuit to determine that the switch of the primary side has been turned on when the detect signal is asserted for longer than a predetermined duration.

6. The circuit of claim 4, wherein a magnitude of the second predetermined detect value is less than the magnitude of output voltage of the power converter circuit.

7. The circuit of claim 4, wherein the predetermined duration is determined according to a predetermined duration voltage value.

8. The circuit of claim 1, wherein the drain detect circuit comprises:
a pulse detect circuit to determine that the switch of the primary side has been turned on when the voltage value of the sense signal is greater than a predetermined detect value for longer than a predetermined duration.

9. The circuit of claim 1, further comprising:
a drain sense circuit to:
receive the sense signal,
determine, using a voltage value of the sense signal and a predetermined on threshold value, an on signal,
determine, using a voltage value of the sense signal and a predetermined off threshold value, an off signal;
wherein the circuit asserts the control signal in response to the on signal being asserted and the enable signal being asserted; and
wherein the circuit de-asserts the control signal in response to the off signal being asserted.

10. The circuit of claim 9,
wherein determining whether a switch of the primary side of the power converter circuit has been turned on includes comparing the voltage value of the sense signal to a predetermined detect value; and
wherein a polarity of the predetermined detect value is opposite a polarity of the predetermined on threshold.

11. A circuit comprising:
a drain detect circuit that receives a sense signal and determines a QDET signal using to the sense signal and one or more of a predetermined high detect threshold and a predetermined middle detect threshold;
a first flip flop circuit that asserts an enable signal in response to an assertion of the QDET signal and de-asserts the enable signal in response to the assertion of a control signal;
an AND gate that receives the enable signal on a first input and receives an on signal on a second input;
a second flip flop circuit that asserts the control signal in response to the assertion of the output of the AND gate and de-asserts the control signal in response to the assertion of an off signal.

12. The circuit of claim 11, further comprising:
a drain sense circuit that receives the sense signal, determines the on signal according to the sense signal and a predetermined on threshold, and determines the off signal according to the sense signal and a predetermined on threshold.

13. The circuit of claim 11, wherein the drain detect circuit comprises:
a comparator to generate a detect output by comparing the sense signal to the predetermined high detect threshold;
wherein drain detect circuit produces the QDET signal using the detect output.

14. The circuit of claim 11, wherein the drain detect circuit comprises:
a comparator to generate a TDRAIN signal by comparing the sense signal to the predetermined middle detect threshold; and
a pulse width comparator circuit to produce a detect output according to whether a pulse of the TDRAIN signal has a duration greater than a predetermined duration,
wherein drain detect circuit produces the QDET signal using the detect output.

15. A method for controlling a Synchronous Rectifier (SR) device, the method comprising:
receiving a sense signal from a conduction terminal of an SR device, the SR device being included in a secondary side of a power converter circuit; and
generating a control signal for a control terminal of the SR device, generating the control signal including:
disabling assertion of the control signal in response to the control signal being asserted;
determining, using the sense signal, whether a switching device has been turned on, the switching device being included in a primary side of the power converter circuit; and
enabling assertion of the control signal in response to determining that the switching device included in the primary side has been turned on.

16. The method of claim 15, wherein determining whether the switching device has been turned on includes determining that the switching device has been turned on in response to the sense signal having a voltage value higher than an predetermined high detect value.

17. The method of claim 15, wherein determining whether the switching device has been turned on includes determining that the switching device has been turned on in response to the sense signal having a voltage value higher than an predetermined middle detect value for an uninterrupted interval greater than a predetermined interval.

18. The method of claim 17, wherein determining whether the switching device has been turned on includes determining that the switching device has been turned on in response to the sense signal having a voltage value higher than an predetermined high detect value.

19. The method of claim 17, wherein the predetermined duration is determined according to a period of a ringing of the conduction terminal and an expected minimum duration of the switching device being been turned on.

* * * * *